United States Patent
Baeuerle

(10) Patent No.: US 12,031,529 B2
(45) Date of Patent: Jul. 9, 2024

(54) FILLING DEVICE FOR FILLING A DEFINED QUANTITY OF A PRODUCT

(71) Applicant: Syntegon Technology GmbH, Waiblingen (DE)

(72) Inventor: Johannes Baeuerle, Obersontheim (DE)

(73) Assignee: Syntegon Technology GmbH, Waiblingen (DE)

( * ) Notice: Subject to any disclaimer, the term of this patent is extended or adjusted under 35 U.S.C. 154(b) by 333 days.

(21) Appl. No.: 17/431,927

(22) PCT Filed: Feb. 19, 2020

(86) PCT No.: PCT/EP2020/054276
§ 371 (c)(1),
(2) Date: Aug. 18, 2021

(87) PCT Pub. No.: WO2020/169627
PCT Pub. Date: Aug. 27, 2020

(65) Prior Publication Data
US 2022/0145867 A1 May 12, 2022

(30) Foreign Application Priority Data
Feb. 22, 2019 (DE) ..................... 10 2019 202 416.5

(51) Int. Cl.
*F04B 1/0408* (2020.01)
*B65B 3/00* (2006.01)
(Continued)

(52) U.S. Cl.
CPC ............ *F04B 1/0408* (2013.01); *B65B 3/003* (2013.01); *B65B 3/32* (2013.01); *F04B 13/00* (2013.01); *F16K 15/147* (2013.01); *F16K 15/148* (2013.01)

(58) Field of Classification Search
CPC .... F04B 53/1065; F04B 53/10; F04B 53/102; F04B 1/0408; F04B 43/025; F04B 13/00; B65B 3/003; B65B 3/33
(Continued)

(56) References Cited

U.S. PATENT DOCUMENTS

| | | | | |
|---|---|---|---|---|
| 1,012,725 A | * | 12/1911 | Shadall | ............... F04B 39/1073 |
| | | | | 417/571 |
| 3,664,774 A | * | 5/1972 | Tupper et al. | ...... F16K 15/1402 |
| | | | | 417/571 |

(Continued)

FOREIGN PATENT DOCUMENTS

| | | |
|---|---|---|
| CN | 103140682 A | 6/2013 |
| DE | 2520849 A1 | 11/1976 |

(Continued)

OTHER PUBLICATIONS

Translation of International Search Report for Application No. PCT/EP2020/054276 dated Jun. 19, 2020 (2 pages).

(Continued)

*Primary Examiner* — Philip E Stimpert
(74) *Attorney, Agent, or Firm* — Michael Best & Friedrich LLP

(57) ABSTRACT

The present invention relates to a filling device for dispensing a defined quantity of a product, comprising:
a piston pump (3) for delivering the product to be dispensed from a reservoir (2) to a filling needle (5),
wherein the piston pump (3) comprises a piston (30), a cylinder body (31), an inlet (33), an outlet (34), a first non-return valve (8) and a second non-return valve (9),
wherein the piston (30), the cylinder body (31), the inlet (34), the outlet (34), the first non-return valve (8) and the second non-return valve (9) are made of a non-metallic material, wherein (Continued)

the inlet (33) and the outlet (34) are arranged inclined at an angle (26, 27) different from zero relative to an axis (22) of the cylinder body (31).

13 Claims, 3 Drawing Sheets

(51) Int. Cl.
  *B65B 3/32* (2006.01)
  *F04B 13/00* (2006.01)
  *F16K 15/14* (2006.01)
(58) Field of Classification Search
  USPC .......................................................... 417/571
  See application file for complete search history.

(56) References Cited

U.S. PATENT DOCUMENTS

| | | | | |
|---|---|---|---|---|
| 4,936,753 | A | * | 6/1990 | Kozumplik, Jr. ..... F04B 53/102 |
| | | | | 417/454 |
| 5,551,483 | A | * | 9/1996 | Hochstrasser ........ F16K 15/145 |
| | | | | 137/853 |
| 2013/0202474 | A1 | | 8/2013 | Krampe |

FOREIGN PATENT DOCUMENTS

| | | | | |
|---|---|---|---|---|
| DE | 102007036265 | A1 | | 2/2009 |
| DE | 102008001204 | A1 | | 10/2009 |
| DE | 102016213847 | A1 | | 2/2018 |
| DE | 102016215875 | A1 | * | 3/2018 ............. B65B 3/003 |
| DE | 102016215875 | A1 | | 3/2018 |
| EP | 3275790 | A2 | | 1/2018 |
| JP | 3801269 | B2 | * | 7/2006 |

OTHER PUBLICATIONS

Translation of the Written Opinion of the International Searching Authority for Application No. PCT/EP2020/054276 dated Jun. 19, 2020 (7 pages).

Chinese Patent Office First Office Action for Application No. 202080015903.0 dated Aug. 3, 2022 (11 pages).

Chinese Patent Office Action for Application No. 202080015903.0, dated Apr. 26, 2023 (11 pages, English translation included).

* cited by examiner

FILLING DEVICE FOR FILLING A DEFINED QUANTITY OF A PRODUCT

BACKGROUND OF THE INVENTION

The present invention relates to a filling device for dispensing a defined quantity of a product, in particular a pharmaceutical product, with a piston pump.

In the pharmaceutical industry, various, in particular liquid, active ingredients must be dispensed into containers, such as bottles or vials or the like, in defined quantities with very narrow tolerances. Filling systems are known which have a stainless steel container that is filled with the product to be dispensed and leads via lines to a distributor pipe or the like, on which one or more filling devices are provided in the form of hoses, at the end of which a filling needle is arranged. A choke is also arranged here through which the active substance to be dispensed is passed. The chokes must be selected depending on the application and are components having the strictest tolerances in order to ensure a high level of accuracy during filling. As a result, such chokes are very expensive. Because products to be dispensed are often changed in the pharmaceutical industry, cross-contamination must be prevented. This requires a great amount of cleaning effort, especially in the case of sterile products, a very great amount of effort. For this reason, single-use products are increasingly being used. Such a filling device with an assembly designed as a single-use item for filling is known from DE 102008001204 A1. Here, however, the accuracy of the filling depends on the activation of a shut-off valve. A generic device is also known from DE 102016215875 A1.

SUMMARY OF THE INVENTION

It is the object of the present invention to further minimize the risk of possible leakage and at the same time to improve the metering accuracy.

The filling device according to the invention for dispensing a defined quantity of a product has the advantage that a very inexpensive piston pump can be provided. Furthermore, according to the invention, highly precise metering of predetermined quantities of the product is possible, so that the filling device can be used in particular for dispensing medical products, in particular liquid or pasty products. The use of the piston pump also ensures that the filling device is independent from a state of an existing product template, because the piston pump provides its own suction stroke. Furthermore, a highly precise metering can be made possible, because metering can be realized with only one single stroke. The risk of possible leakage during operation can be minimized because the connection point is outside the cylinder at almost ambient pressure. By arranging the inlet and outlet with a certain inclination relative to the axis of the cylinder body, the dead space can be minimized. This allows faster and safer venting to be achieved. This also improves the metering accuracy. The metering accuracy can be further optimized, in particular due to the different design of the non-return valves. Especially when using an umbrella valve and a duckbill valve, on the one hand the inlet valve opening pressure can be selected to be minimal and the outlet opening pressure can be selected to be correspondingly high.

In an expedient further development, the cylinder body comprises at least one wall region for fastening at least one nozzle. This reduces the risk of leaks, because the fastening point is relocated to the outside of the cylinder body. In addition, relatively quick adjustments to different hose geometries can be achieved using different nozzles.

According to an expedient further development, the wall region has at least one connection point for a nozzle and/or at least one receiving surface for a seal. This increases the flexibility of the arrangement and, by provision of a seal, reduces the risk of leaks.

In an expedient further development, different non-return valves are used, in particular the non-return valve in the outlet is designed as an umbrella valve and/or the non-return valve in the inlet is designed as a duckbill valve, a valve with a beak-shaped region for opening and closing. As a result, the inlet valve opening pressure can be set to a minimum and the outlet opening pressure can be set correspondingly high, so that the filling accuracy can be improved.

In an expedient further development, an opening is provided in the cylinder body for receiving the non-return valve. In particular, this opening is arranged between an interior space of the cylinder body and an inlet or outlet. This means that the same cylinder body can always be used for quick and flexible assembly of the suitable valve types, depending on the application.

In an expedient further development, it is provided that the non-return valve at least partially covers at least one outer surface of the wall region of the cylinder body, so that the nozzle acts directly on the non-return valve, in particular on a flange of the non-return valve. A direct seal between the nozzle and the cylinder body can thus be achieved without the use of an additional seal.

In an expedient further development, a seal is arranged between the nozzle and the cylinder body, and the cylinder body preferably has corresponding receiving surfaces. A secure seal is thus achieved and at the same time the seal is held in the desired position.

In an expedient further development, the interior space essentially has a trapezoidal cross section. This avoids dead spaces. This contributes to faster and safer venting. This increases the filling accuracy.

In an expedient further development, the piston pump, the filling needle and the connecting line form an assembly that is designed as a single-use item. This allows the assembly to be easily disposed of after use. To keep the costs of the filling device low, the cylinder body, the piston, the cylinder cover, the inlet, the outlet, the nozzles and the first and second non-return valve are made of a non-metallic material. This prevents cross-contamination when different pharmaceutical products are dispensed one after the other. This is because absolute cleanliness can never be ensured even after cleaning in the case of cleaning processes that have to be carried out in systems that can be used repeatedly. Thus, the invention is particularly suitable for toxic applications. Furthermore, the components of the filling device do not have to be prepared because the piston pump is already preassembled in the filling device. This reduces the assembly effort, so that minimal process costs arise. There are also no costs for cleaning or the like.

The filling device according to the invention is particularly preferably used for dispensing pharmaceutical products, in particular liquids or pasty products.

Additional expedient further developments result from further dependent claims and from the description.

BRIEF DESCRIPTION OF THE DRAWINGS

A preferred embodiment of the invention is described in detail below with reference to the accompanying drawing, in which.

DETAILED DESCRIPTION

A filling device 1 according to a first preferred embodiment of the invention is described in detail below with reference to FIGS. 1 to 3.

Figure 1:
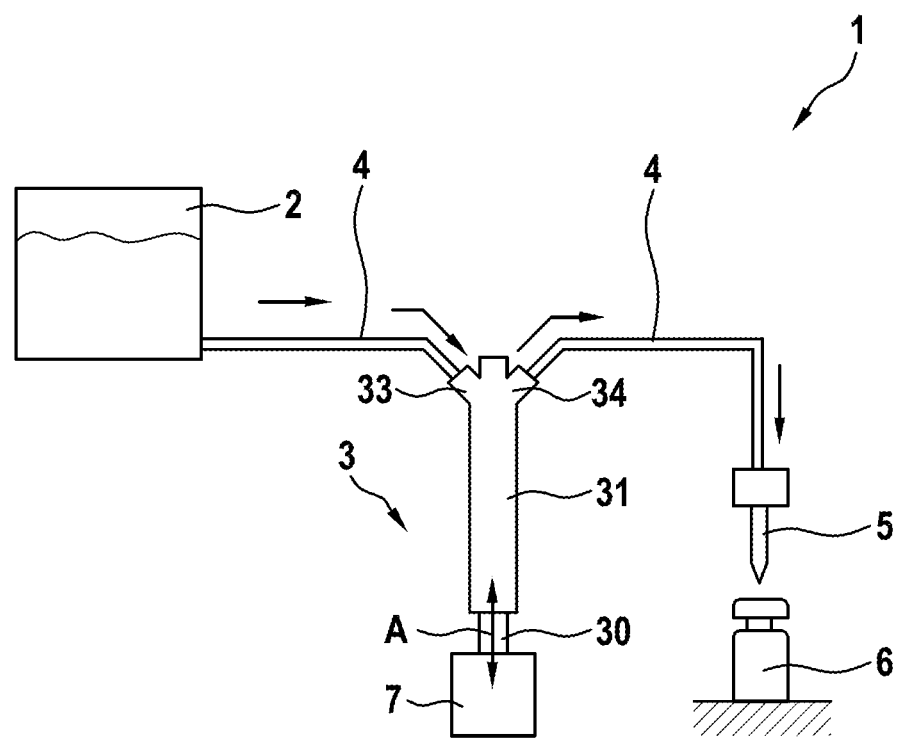
FIG. 1 is a schematic view of a filling device according to a preferred embodiment of the invention.
Figure 2:
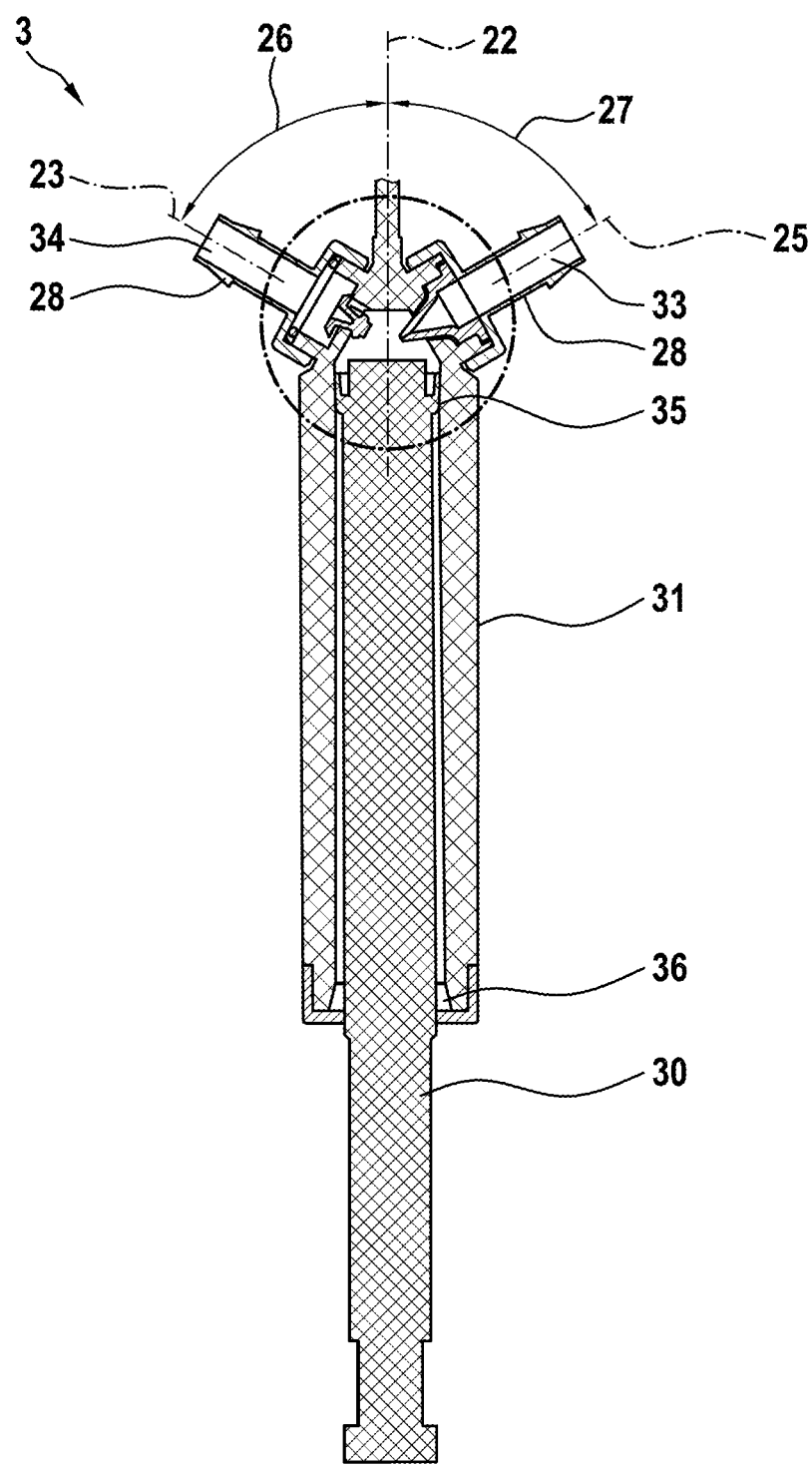
FIG. 2 is a schematic sectional view of a piston pump of FIG. 1

As can be seen from FIG. 1, the filling device 1 comprises a reservoir 2 in which a product to be dispensed is stored. The product to be dispensed is preferably a pharmaceutical product, for example a medicament.

The reservoir 2 is connected via a connecting line 4 to a filling needle 5 which, as a metering device, dispenses the product to be dispensed into containers 6, for example vials or the like.

A piston pump 3, which comprises an oscillating piston 30, is arranged in the connecting line 4. This is indicated by the double arrow A in FIG. 1. The piston 30 is arranged so as to reciprocate in a cylinder body 31.

The piston pump 3 is driven by means of a drive 7.

A cylinder body 31 at least partially surrounds a piston 30. In the lower region of the cylinder body 31, a guide element 36 is provided for guiding the piston 30. The cylinder body 31 or the piston 30 has an axis 22 oriented along the cylinder axis.

At least one inlet 33 and one outlet 34 are provided in the upper region of the cylinder body 31. The particularly tubular portion of the inlet 33 has an axis 25. The axis 25 of the inlet 33 is designed to be inclined at an angle 26 different from zero relative to the axis 22 of the cylinder body 31. An axis 23 of the outlet 34 is designed to be inclined at an angle 27 different from zero relative to the axis 22 of the cylinder body 31. The two angles 26, 27 are preferably designed to be almost identical. In the embodiment, the angles 26, 27 are acute angles, that is to say in an angle range between 0° and 90°. The angle 26, 27 is particularly preferably in a range between 20° and 70°; in the embodiment, an angle of approximately 57.5° has proven particularly useful. The inlet 33 and/or the outlet 34 each comprise a nozzle 28 or a hose nozzle for fastening the connecting line or a hose.

Figure 3:
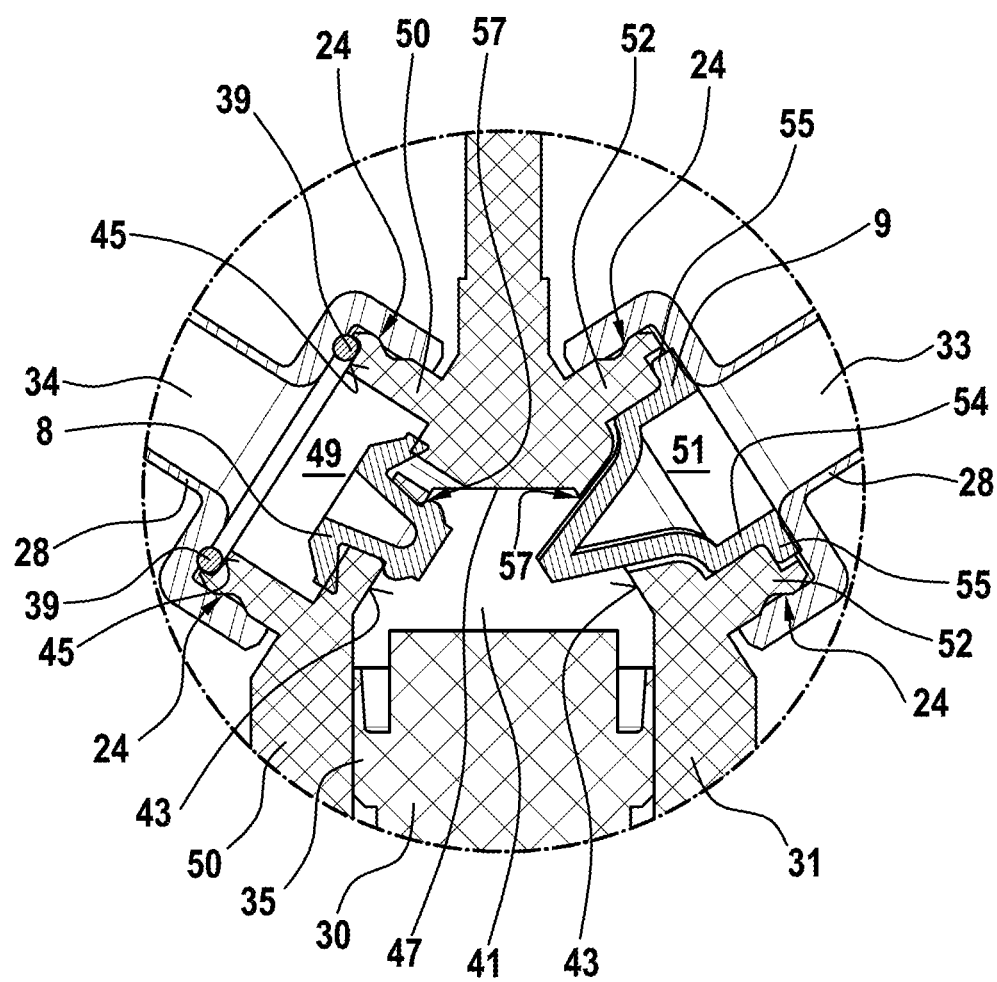
FIG. 3 is an enlarged sectional view of the upper region of the piston pump according to FIG. 2.

The nozzle 28 is connected or can be connected to the cylinder body 31 via a connection point 24, as shown in more detail in the detailed view according to FIG. 3. The cylinder body 31 terminates at the top in an interior space 41. The interior space 41 essentially has a trapezoidal cross section. The trapezoidal cross section is not axially symmetrical, but is only present in the section of the sectional direction shown. Inlet 33 and outlet 34 each open into mouth surfaces 43 in this interior space 41. These mouth surfaces 43 are conical or tapered. The mouth surfaces 43 are designed to be inclined relative to the axis 22. The mouth surfaces 43 are essentially perpendicular to the axes 25, 23 of the inlet 33 and outlet 34, respectively.

To receive the non-return valve 8, a corresponding opening 57 is provided between the mouth surface 43 and a recess 49. In particular, the openings 57 are arranged between the interior space 41 and the inlet 33 or outlet 34. This can be, for example, a cylindrical receiving bore. In the embodiment, an umbrella valve is provided as a non-return valve 8 for the outlet 34. The umbrella-shaped portions cover any openings between the outlet 34 and the interior space 41. A recess 51 is provided for receiving the non-return valve 9, in particular designed as a duckbill valve. This recess 51 is essentially cylindrical. The recess 51 is essentially adapted to the cylindrical portion 54 of the non-return valve 9. An opening 57 is provided between the recess 51 and the interior space 41 to lead through the beak-shaped region of the non-return valve 9. This opening 57 opens into the interior space 41 in the receiving surface 43.

When using a duckbill valve, the inlet valve opening pressure is minimal. When using an umbrella valve, the outlet valve opening pressure is correspondingly high. This allows the filling accuracy to be optimized.

At the end oriented toward the interior space 41, the non-return valve 8 has a thickening with a somewhat larger diameter than the opening of the mouth surfaces 43 surrounding the non-return valve 8. This is used to fix the non-return valve 8. The thickening and the screen together with a corresponding height of the receiving bore or opening 57 form the valve preload. For the simple assembly of the non-return valve 8, a conical recess is provided on the upper face of the umbrella valve into which the assembly tool can be inserted. For this purpose, the non-return valve 8 is made of an elastic material (for example a plastic or a rubber mixture such as VMQ) and can be inserted from the outside through the opening of the mouth surfaces.

On the side of the outlet 34, the cylinder body 31 terminates in the recess 49. The recess 49 is aligned with the nozzle 28. The liquid to be metered reaches the connecting line 4 via the interior space 41 via the non-return valve 8, the recess 49 and the outlet 34 with the nozzle 28. A connection point 24 is provided on the outer region of the cylinder body 31 of a wall region 50 which laterally delimits the recess 49. The connection point 24 of the cylinder body 31 is, for example, an external depression or groove. This connection point 24 interacts with a corresponding projection of the end portion of the nozzle 28. The end portion of the nozzle 28 widens slightly and surrounds the wall region 50 of the cylinder body 31 in the region of the recess 49. This would be conceivable, for example, if no seal 39 is used. The connection point 24 is, for example, part of a clip connection. Alternative connection options are conceivable. For example, the connection between nozzle 28 and cylinder body 31 could also be made by welding or laser welding, a screw connection or the like.

A receiving surface 45 is provided at the end portion of the wall region 50. The receiving surface 45 serves to receive a seal 39. The seal 39 is designed, for example, as an O-ring. The seal 39 serves to seal between the cylinder body 31 and the nozzle 28. The receiving surface 45 for the seal 39 is adapted to the outer contour of the seal 39. In the embodiment, it is, for example, a semi-circular or annular contour. The seal 39 could be omitted if the clipped-on nozzle 28 is installed under tension.

The cylinder body 31 is designed in the region of the inlet 33 in a manner similar to that in the region of the outlet 34. A recess 51 is in turn provided which is formed laterally by wall regions 52 of the cylinder body 31. At least one connection point 24 is provided on the outer region of the wall region 52 for connecting the nozzle 28 to the cylinder body 31. The connection point 24 of the cylinder body 31 is, for example, an external depression or groove. This connection point 24 interacts with a corresponding projection of the end portion of the nozzle 28. The end portion of the nozzle 28 widens slightly and surrounds the wall region 52 of the cylinder body 31 in the region of the recess 51. The connection point 24 is, for example, part of a clip connection. Alternative connection options are conceivable. For example, the connection between nozzle 28 and cylinder body 31 could also be made by welding or laser welding or the like.

The non-return valve 9 is designed as a duckbill valve in the embodiment. A duckbill valve is designated as a valve, the function of which is formed by an opening or closing beaks or lips situated one over the other. The beak-shaped part of the non-return valve 9 is surrounded by a corresponding opening geometry or opening 57 of the cylinder body 31, which corresponds to the beak shape of the non-return valve 9. This minimizes the dead space. The duckbill valve or non-return valve 9 terminates at the opposite end in a cylindrical portion 54. The end of the cylindrical portion 54 terminates in a flange 55. The cylindrical portion 54 and the flange 55 are accommodated by corresponding geometries of the wall region 52. The flange 55 or its end face facing away from the interior space 41 interacts with the widening end portion of the nozzle 28. The end portion of the nozzle 28 encompasses both the end portion of the non-return valve 9 and the outer region of the wall portion 52 of the cylinder body 31. This creates a seal between the nozzle 28 and the cylinder housing 31, in particular using the non-return valve 9, particularly preferably using the duckbill valve or its flange portion 55. A separate seal can be dispensed with here. Here, the clipped-on nozzle 28 should be installed under tension.

The interior space 41 is delimited by an end face 47. The end face 47 is oriented transversely to the axis 22. The end face 47 is preferably planar. The selected geometry of the interior space 41 ensures that almost no dead spaces are formed. This allows faster and safer venting to be achieved. This also contributes to improved filling accuracy.

The connection point 24 is provided in an outer wall region 50, 52 between the cylinder body 31 and the nozzle 28. The risk of a possible leakage during operation is minimized because the connection point 24 has been moved outside of the cylinder body 31, in particular on the wall regions 50, 52 on the outside, and is almost exposed to the ambient pressure.

The two non-return valves 8, 9 are designed differently. What is achieved thereby is that a suction process and a delivery process are allowed depending on a direction of movement of the piston 30. The non-return valves 8, 9 can consist of a suitable plastic, for example a rubber mixture such as VMQ (vinyl methyl silicone) or the like.

A seal 35 is formed integrally on the piston 30 and is made of the same material as the material of the piston 30. The material used is preferably UHMW polyethylene. The circumferential seal 35 ensures that a seal tightness to the cylinder body 31 is provided during the suction stroke, that is, when the piston 30 is moved in the direction away from the upper region of the cylinder body 31 at which the inlet 33 and outlet 34 are located, and during a pressure movement, in which the piston 30 is moved in the direction of the upper region. The sealing lip pretensioning also contributes to a large extent to the seal. By integrating the seal 35 in the piston 30, a particularly cost-effective structure can be achieved. The seal 35 is arranged on an enlarged diameter of the piston 30. Also for the nozzle 28, from another plastic is preferably made from a plastic such as PE or PP.

Because the connecting lines 4, the piston pump 3, nozzles 28 and the filling needle 5 are provided as an assembly which is designed as a single-use item, the seal 35 is sufficiently dimensioned to ensure that the piston pump is sealed for the filling process of the product stored in the reservoir 2. Because the assembly with the connecting line 4, nozzles 26, piston pump 3 and filling needle 5 is disposed of after use, there is no need to ensure long-term seal tightness. The seal tightness only has to be ensured for the filling process.

A guide element 36 is also provided so that the piston 30 is safely guided in the cylinder body 31. The guide element 36 guides the piston 30 in the cylinder body 31. The guide element 36 is arranged in the cylinder body by means of a clip connection. More precisely, the clip connection is provided at the end of the cylinder body 31 remote from the inlet 33 or outlet 34.

Thus, according to the invention, a single-use filling device 1 can be provided in which a very inexpensive piston pump 3 can be used. In this case, the inexpensive piston pump 3, which is preferably made of PEEK or UHMW polyethylene, can provide the same filling capacities as a metallic piston pump that is typically used. By integrating the piston pump 3 in the filling device 1, independence from a state of an existing product template can also be ensured. Furthermore, the piston pump 3 is configured in such a way that the container 6 can be filled with a single stroke. In this way, a particularly precisely metered volume can be achieved.

Because the piston pump 3, the nozzles 28, the connecting lines 4 and the filling needle 5 form a single-use assembly, no cross-contamination can occur during successive filling processes. Furthermore, a faster product change on the filling device can also be achieved. There is also no need to clean components of the filling device.

The assembly comprising the piston pump 3, the nozzles 28, the connecting lines 4 and the filling needle 5 is particularly preferably supplied as a pre-sterilized system, so that the assembly can be used immediately after being unpacked.

The seal 35 preferably has a sealing lip with pretensioning. A particularly reliable sealing of the piston in the cylinder body 31 can thereby be achieved.

Due to the design of the first non-return valve 8 as an umbrella valve and the further non-return valve 9 as a duckbill valve, no special mechanical control element has to be used for switching between the filling and suction cycles. The non-return valves 8, 9 are controlled exclusively via the respective existing pressure in the piston pump. A necessary opening and closing pressure for the non-return valves 8, 9 can be varied by selecting the valve geometries used in each case for the umbrella valve or the duckbill valve. It should be noted here that an adaptation to a viscosity of the product to be dispensed is possible through the selection of a predetermined valve preload and valve geometry of the non-return valves 8, 9. Thus, a piston pump 3 can be realized, the non-return valves 8, 9 of which are controlled by the fluid pressure.

Thus, according to the invention, a filling device can be provided which provides an assembly designed as a single-use item with piston pump 3, nozzles 28, connecting lines 4 and filling needle 5. A single-use piston pump can thus be used that can be manufactured particularly inexpensively and allows particularly highly precise metering compared to peristaltic pumps. Components that come into contact with the product no longer have to be cleaned, because the components that come into contact with the product can be disposed of as single-use items. This also eliminates the risk of cross-contamination in the dispensing of pharmaceutical products in particular.

What is claimed is:

1. A filling device for dispensing a defined quantity of a product, comprising:
   a piston pump for delivering the product to be dispensed from a reservoir to a filling needle,
   wherein the piston pump comprises a piston, a cylinder body, an inlet, an outlet, a first non-return valve arranged at the outlet, and a second non-return valve arranged at the inlet,
   wherein the piston, the cylinder body, the inlet, the outlet, the first non-return valve and the second non-return valve are made of a non-metallic material,
   wherein the inlet includes a central axis and the outlet includes a central axis,
   wherein the central axis of the inlet and the central axis of the outlet are arranged inclined at an angle within a range between 30° and 70° relative to an axis of the cylinder body,
   wherein the inlet and the outlet are arranged in an upper region of the cylinder body,
   wherein the first non-return valve is an umbrella valve and the second non-return valve is a duckbill valve, and
   wherein a beak-shaped portion of the second non-return valve is surrounded by a corresponding opening geometry or orifice of the cylinder body that corresponds to the beak-shaped portion of the second non-return valve.

2. The filling device according to claim 1, wherein the cylinder body comprises at least one wall region for fastening at least one nozzle.

3. The filling device according to claim 2, wherein the wall region has at least one connection point for a nozzle and/or at least one receiving surface for a seal.

4. The filling device according to claim 1, wherein at least one opening is provided in the cylinder body for receiving at least one of the non-return valves.

5. The filling device according to claim 1, further comprising at least one nozzle for the inlet or outlet.

6. The filling device according to claim 5, wherein at least one of the non-return valves at least partially covers at least one outer surface of a wall region of the cylinder body, so that the nozzle acts directly upon the at least one non-return valve.

7. The filling device according to claim 5, wherein at least one seal is arranged between the nozzle and the cylinder body.

8. The filling device according to claim 1, wherein the cylinder body has at least one interior space which has a trapezoidal cross section.

9. The filling device according to claim 1, wherein the cylinder body has at least one recess and at least one interior space, wherein at least one receptacle for at least one of the non-return valves is provided between the recess and opens into a receiving surface or the interior space.

10. The filling device according to claim 1, further comprising
    a reservoir for storing the product to be dispensed,
    a filling needle for dispensing the product to be dispensed,
    a connecting line to connect the reservoir to the filling needle.

11. The filling device according to claim 10, wherein the piston pump, the filling needle, a nozzle and the connecting line form an assembly which is designed as a single-use item.

12. The filling device according to claim 6, wherein the nozzle acts directly upon on a flange of the non-return valve.

13. The filling device according to claim 7, wherein the seal is an O-ring arranged between and contacting the nozzle and the cylinder body, and wherein the seal is positioned on a receiving surface of the cylinder body.

* * * * *